(12) United States Patent
Hwang et al.

(10) Patent No.: US 10,527,133 B2
(45) Date of Patent: Jan. 7, 2020

(54) MULTI-STAGE TRANSMISSION FOR VEHICLE

(71) Applicants: Hyundai Motor Company, Seoul (KR); Kia Motors Corporation, Seoul (KR)

(72) Inventors: Seong Wook Hwang, Gunpo-si (KR); Hyun Sik Kwon, Seoul (KR); Ki Tae Kim, Incheon (KR); Won Min Cho, Hwaseong-si (KR); Jae Chang Kook, Hwaseong-si (KR); Seong Wook Ji, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 143 days.

(21) Appl. No.: 15/831,168

(22) Filed: Dec. 4, 2017

(65) Prior Publication Data
US 2019/0113108 A1     Apr. 18, 2019

(30) Foreign Application Priority Data

Oct. 16, 2017     (KR) .................. 10-2017-0134223

(51) Int. Cl.
*F16H 3/66*     (2006.01)

(52) U.S. Cl.
CPC ............. *F16H 3/663* (2013.01); *F16H 3/66* (2013.01); *F16H 3/666* (2013.01); *F16H 2200/0078* (2013.01); *F16H 2200/0086* (2013.01); *F16H 2200/201* (2013.01); *F16H 2200/2012* (2013.01); *F16H 2200/2023* (2013.01); *F16H 2200/2048* (2013.01)

(58) Field of Classification Search
CPC ............. F16H 3/663; F16H 2200/0086; F16H 2200/2023; F16H 2200/2048; F16H 2200/0078; F16H 2200/2012
See application file for complete search history.

(56) References Cited

U.S. PATENT DOCUMENTS

| | | | | |
|---|---|---|---|---|
| 2012/0178581 A1* | 7/2012 | Wittkopp | ............... | F16H 3/663 475/275 |
| 2012/0329600 A1* | 12/2012 | Park | ............... | F16H 3/66 475/276 |
| 2013/0029799 A1* | 1/2013 | Park | ............... | F16H 3/663 475/276 |
| 2015/0267785 A1* | 9/2015 | Hart | ............... | F16H 3/66 475/277 |

FOREIGN PATENT DOCUMENTS

KR     10-2013-0003981 A     1/2013

* cited by examiner

*Primary Examiner* — David J Hlavka
(74) *Attorney, Agent, or Firm* — Morgan, Lewis & Bockius LLP (57) ABSTRACT

A multi-stage transmission for a vehicle, may include an input shaft and an output shaft; a first planetary gear set, a second planetary gear set, a third planetary gear set, and a fourth planetary gear set provided to transfer a torque between the input shaft and the output shaft and each including three rotation elements; and seven shifting elements connected to the rotation elements of the planetary gear sets.

13 Claims, 4 Drawing Sheets

| GEAR | C1 | C2 | C3 | C4 | C5 | B1 | B2 |
|------|----|----|----|----|----|----|----|
| 1ST  |    | ●  |    | ●  |    |    | ●  |
| 2ND  |    | ●  | ●  |    |    |    | ●  |
| 3RD  |    | ●  |    |    |    | ●  | ●  |
| 4TH  |    |    | ●  |    |    | ●  | ●  |
| 5TH  |    |    |    |    | ●  | ●  | ●  |
| 6TH  |    |    | ●  |    | ●  | ●  |    |
| 7TH  |    | ●  |    |    | ●  | ●  |    |
| 8TH  | ●  | ●  |    |    | ●  |    |    |
| 9TH  | ●  |    |    |    | ●  | ●  |    |
| 10TH | ●  | ●  |    |    |    | ●  |    |
| 11TH | ●  |    | ●  |    |    | ●  |    |
| 12TH | ●  |    |    | ●  |    | ●  |    |
| 13TH |    |    | ●  | ●  |    | ●  |    |
| 14TH |    | ●  |    | ●  |    | ●  |    |
| R1   | ●  |    | ●  |    |    |    | ●  |
| R2   | ●  |    |    | ●  |    |    | ●  |

FIG. 4

MULTI-STAGE TRANSMISSION FOR VEHICLE

CROSS REFERENCE TO RELATED APPLICATION

The present application claims priority to Korean Patent Application No. 10-2017-0134223, filed on Oct. 16, 2017, the entire contents of which is incorporated herein for all purposes by this reference.

BACKGROUND OF THE INVENTION

Field of the Invention

The present invention relates to a multi-stage transmission for a vehicle configured for improving fuel efficiency of a vehicle by implementing as many shift stages as possible with a small number of components and a simple structure.

Description of Related Art

Recently, a rise in an oil price has become a factor allowing vehicle manufacturers throughout the world to enter into unlimited competition toward fuel efficiency improvement, and in the case of an engine, an effort to improve fuel efficiency and decrease a weight through a technology such as downsizing, or the like, has been conducted.

Meanwhile, among methods of improving fuel efficiency that may include a transmission mounted in a vehicle, there is a method of allowing an engine to be driven at a more efficient driving point through a multi-stage transmission to ultimately improve fuel efficiency.

Furthermore, the multi-stage transmission as described above may allow the engine to be driven in a relatively low revolution per minute (RPM) band to further improve silence of the vehicle.

However, as shift stages of the transmission are increased, the number of internal components configuring the transmission is increased, such that a mounting feature and transfer efficiency may be deteriorated and a cost and a weight may be increased. Therefore, to maximize a fuel efficiency improving effect through the multi-stage transmission, it is important to devise a transmission structure of deriving maximum efficiency by a small number of components and a relatively simple configuration.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a multi-stage transmission for vehicle configured for improving fuel efficiency of a vehicle by implementing as many shift stages as possible with a small number of components and a simple structure if possible.

According to an exemplary embodiment of the present invention, there is provided a multi-stage transmission for a vehicle, including: an input shaft and an output shaft; a first planetary gear set, a second planetary gear set, a third planetary gear set, and a fourth planetary gear set provided to transfer a torque between the input shaft and the output shaft and each including three rotation elements; and seven shifting elements connected to the rotation elements of the planetary gear sets, in which a first rotation element of the first planetary gear set is fixedly installed to a transmission housing by one of the shifting elements, a second rotation element is fixedly connected to a third rotation element of the second planetary gear set, a first rotation element of the third planetary gear set is fixedly connected to a first rotation element of the fourth planetary gear set, a second rotation element is fixedly connected to a third rotation element and an output shaft of the fourth planetary gear set, the third rotation element of the third planetary gear set is fixedly connected to a transmission housing by one of the shifting elements, and a second rotation element of the fourth planetary gear set is variably connected to the input shaft.

The second rotation element of the first planetary gear set may be fixedly connected to the input shaft, the third rotation element may be variably connected to the third rotation element of the third planetary gear set while being fixed connected to the second rotation element of the second planetary gear set, the first rotation element of the second planetary gear set may be variably connected to the second rotation element of the fourth planetary gear set while being variably connected to the first rotation element of the third planetary gear set, and the first rotation element of the third planetary gear set may be variably connected to the second rotation element of the second planetary gear set.

The first rotation element of the first planetary gear set may be fixedly installed in the transmission housing by a first brake among the shifting elements, the third rotation element of the third planetary gear set may be fixedly installed in the transmission housing by a second brake among the shifting elements, and the rest of the shifting elements may be provided to form a variable connection structure between the rotation elements of the planetary gear sets.

A first clutch among the shifting elements may be configured to form a variable connection structure between the third rotation element of the first planetary gear set and the third rotation element of the third planetary gear set, a second clutch among the shifting elements may be configured to form a variable connection structure between the second rotation element of the second planetary gear set and the first rotation element of the third planetary gear set, a third clutch among the shifting elements may be configured to form a variable connection structure between a first rotation element of the second planetary gear set and the first rotation element of the third planetary gear set, a fourth clutch among the shifting elements may be configured to form a variable connection structure between the first rotation element of the second planetary gear set and the second rotation element of the fourth planetary gear set, and a fifth clutch among the shifting elements may be configured to form a variable connection structure between the input shaft and a second rotation element of the fourth planetary gear set.

The first rotation element of the first planetary gear set may be fixedly connected to the first rotation element of the second planetary gear set, the second rotation element may be variably connected to the third rotation element of the third planetary gear set while being variably connected to the first rotation element of the third planetary gear set, the third rotation element may be variably connected to the first rotation element of the third planetary gear set while being variably connected to the second rotation element of the fourth planetary gear set, and the second rotation element of the second planetary gear set may be fixedly connected to the input shaft.

The first rotation element of the first planetary gear set may be fixedly installed in the transmission housing by a first brake among the shifting elements, the third rotation element of the third planetary gear set may be fixedly installed in the transmission housing by a second brake among the shifting elements, and the rest of the shifting elements may be provided to form a variable connection structure between the rotation elements of the planetary gear sets.

A first clutch among the shifting elements may be configured to form a variable connection structure between the second rotation element of the first planetary gear set and the third rotation element of the third planetary gear set, a second clutch among the shifting elements may be configured to form a variable connection structure between the second rotation element of the first planetary gear set and the first rotation element of the third planetary gear set, a third clutch among the shifting elements may be configured to form a variable connection structure between a third rotation element of the first planetary gear set and the first rotation element of the third planetary gear set, a fourth clutch among the shifting elements may be configured to form a variable connection structure between the third rotation element of the first planetary gear set and the second rotation element of the fourth planetary gear set, and a fifth clutch among the shifting elements may be configured to form a variable connection structure between the input shaft and a second rotation element of the fourth planetary gear set.

According to another exemplary embodiment of the present invention, there is provided a multi-stage transmission for a vehicle, including: an input shaft and an output shaft; a first complex planetary gear set and a second complex planetary gear set provided to transfer a torque between the input shaft and the output shaft and each include four rotation elements; and seven shifting elements configured to be connected to the rotation elements of the complex planetary gear sets, in which the first rotation element of the first complex planetary gear set may be fixedly installed in the transmission housing by one of the shifting elements, the second rotation element may be fixedly connected to the input shaft, the third rotation element may be variably connected to the fourth rotation element of the second complex planetary gear set while being variably connected to the first rotation element of the second complex planetary gear set, the fourth rotation element may be variably connected to the second rotation element of the second complex planetary gear set while being variably connected to the first rotation element of the second complex planetary gear set, and the second rotation element of the second complex planetary gear set may be variably connected to the input shaft, the third rotation element may be fixedly connected to the output shaft, and the fourth rotation element may be fixedly installed in the transmission housing by one of the shifting elements.

The first rotation element of the first complex planetary gear set may be fixedly installed in the transmission housing by a first brake among the shifting elements, the fourth rotation element of the second complex planetary gear set may be fixedly installed in the transmission housing by a second brake among the shifting elements, and the rest of the shifting elements may be provided to form a variable connection structure between the rotation elements of the complex planetary gear sets.

The first clutch among the shifting elements may be configured to form the variable connection structure between the third rotation element of the first complex planetary gear set and the fourth rotation element of the second complex planetary gear set, the second clutch among the shifting elements may be configured to form the variable connection structure between the third rotation element of the first complex planetary gear set and the first rotation element of the second complex planetary gear set, the third clutch among the shifting elements may be configured to form the variable connection structure between the fourth rotation element of the first complex planetary gear set and the first rotation element of the second complex planetary gear set, the fourth clutch among the shifting elements may be configured to form the variable connection structure between the fourth rotation element of the first complex planetary gear set and the second rotation element of the second complex planetary gear set, and the fifth clutch among the shifting elements may be configured to form the variable connection structure between the input shaft and the second rotation element of the second complex planetary gear set.

The first rotation element of the first complex planetary gear set may be configured for a first sun gear S1, the second rotation element may be configured for a first planet carrier and a second ring gear C1/R2, the third rotation element may be configured for a first ring gear and a second planet carrier R1/C2, the fourth rotation element may be configured for a second sun gear S2, the first rotation element of the second complex planetary gear set may be configured for third and fourth sun gears S3/S4, the second rotation element may be configured for a fourth planet carrier C4, the third rotation element may be configured for a third planet carrier and a fourth ring gear C3/R4, and the fourth rotation element may be configured for a third ring gear R3.

The first rotation element of the first complex planetary gear set may be configured for the first and second sun gears S1/S2, the second rotation element may be configured for the second planet carrier C2, the third rotation element may be configured for the first planet carrier and the second ring gear C1/R2, the fourth rotation element may be configured for the first ring gear R1, the first rotation element of the second complex planetary gear set may be configured for third and fourth sun gears S3/S4, the second rotation element may be configured for the fourth planet carrier C4, the third rotation element is configured for the third planet carrier and the fourth ring gear C3/R4, and the fourth rotation element may be configured for the third ring gear R3.

The first rotation element of the first complex planetary gear set may be configured for a single pinion type first sun gear S1, the second rotation element may be configured for first and second planet carriers C1/C2, the third rotation element may be configured for first and second ring gears R1/R2, the fourth rotation element may be configured for a double pinion type second sun gear S2, the first rotation element of the second complex planetary gear set may be configured for third and fourth sun gears S3/S4, the second rotation element may be configured for a fourth planet carrier C4, the third rotation element may be configured for a third planet carrier and a fourth ring gear C3/R4, and the fourth rotation element may be configured for a third ring gear R3.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, a multi-stage transmission for a vehicle according to exemplary embodiments of the present invention will be described with reference to the accompanying drawings.

Figure 1:
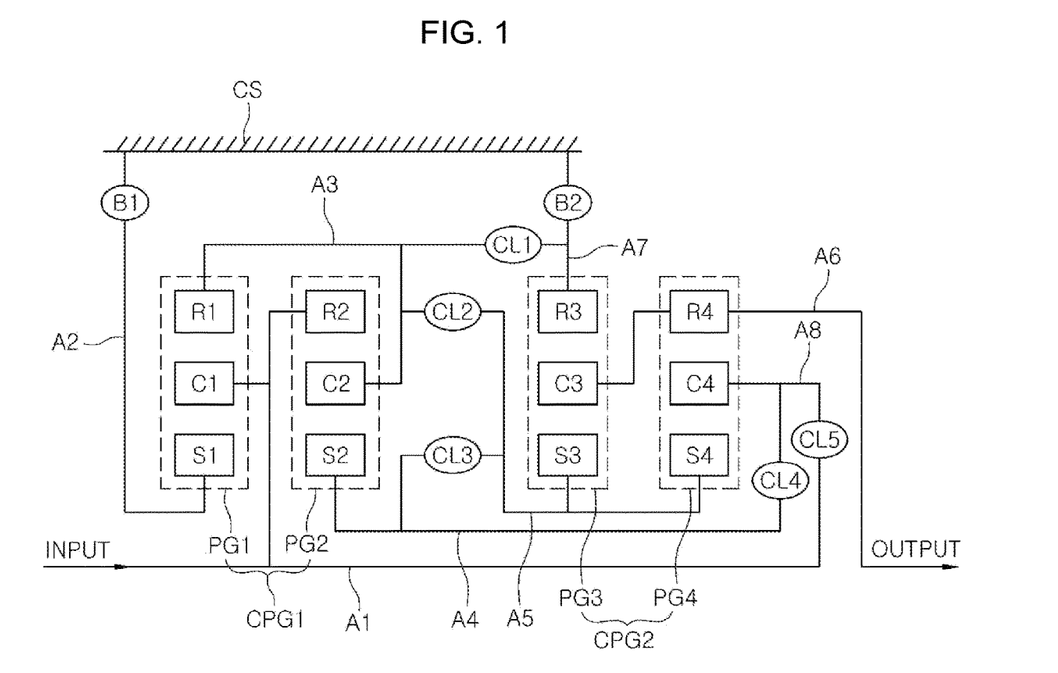
FIG. 1 is a view illustrating a multi-stage transmission for a vehicle according to various exemplary embodiments of the present invention.
Figure 2:
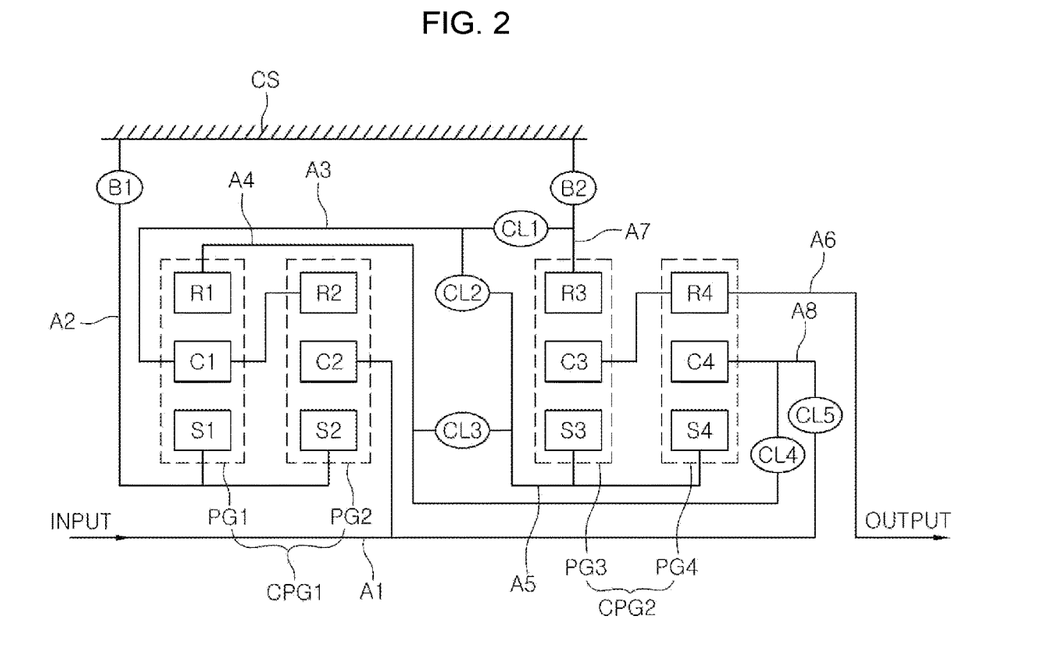
FIG. 2 is a view illustrating a multi-stage transmission for a vehicle according to various exemplary embodiments of the present invention.
Figure 3:
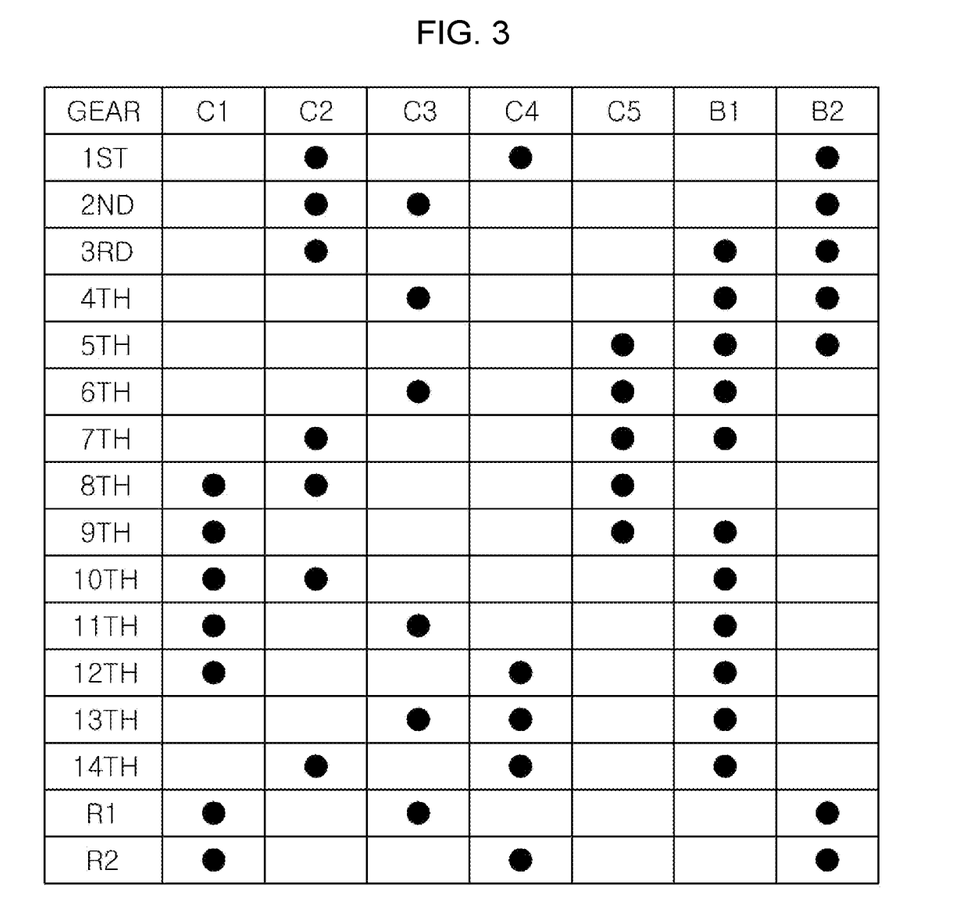
FIG. 3 is a table illustrating an operation of each shift stage of a multi-stage transmission for a vehicle according to an exemplary embodiment of the present invention.

FIG. 1 is a view illustrating a multi-stage transmission for a vehicle according to various exemplary embodiments of the present invention, FIG. 2 is a view illustrating a multi-stage transmission for a vehicle according to various exemplary embodiments of the present invention, and FIG. 3 is a table illustrating an operation of each shift stage of a multi-stage transmission for a vehicle according to an exemplary embodiment of the present invention.

Referring to FIG. 1 and FIG. 2, a multi-stage transmission for a vehicle according to first and various exemplary embodiments of the present invention is configured to include: an input shaft INPUT and an output shaft OUTPUT; a first planetary gear set PG1, a second planetary gear set PG2, a third planetary gear set PG3, and a fourth planetary gear set PG4 provided to transfer a torque between the input shaft INPUT and the output shaft OUTPUT and each including three rotation elements; and seven shifting elements connected to the rotation elements of the planetary gear sets.

In the present configuration, a first rotation element S1 of the first planetary gear set PG1 may be fixedly installed to a transmission housing by one of the shifting elements, a second rotation element C1 may be fixedly connected to a third rotation element R2 of the second planetary gear set PG2, a first rotation element S3 of the third planetary gear set PG3 may be fixedly connected to a first rotation element S4 of the fourth planetary gear set PG4, a second rotation element C3 may be fixedly connected to a third rotation element R4 and an output shaft OUTPUT of the fourth planetary gear set PG4, the third rotation element R3 may be fixedly connected to a transmission housing by one of the shifting elements, and a second rotation element C4 of the fourth planetary gear set PG4 may be variably connected to the input shaft INPUT.

The first planetary gear set PG1, the second planetary gear set PG2, the third planetary gear set PG3, and the fourth planetary gear set PG4 are sequentially disposed along an axial direction of the input shaft INPUT and the output shaft OUTPUT.

Therefore, the first planetary gear set PG1, the second planetary gear set PG2, the third planetary gear set PG3, and the fourth planetary gear set PG4 are connected between the input shaft INPUT to which power is input and the output shaft OUTPUT through which power is output, implementing the multi shift stage.

In the exemplary embodiment of the present invention, the first rotation element S1, the second rotation element C1, and the third rotation element R1 of the first planetary gear set PG1 are a first sun gear, a first planet carrier, and a first ring gear, respectively, the first rotation element S2, the second rotation element C2, and the third rotation element R2 of the second planetary gear set PG2 are a second sun gear, a second planet carrier, and a second ring gear, respectively, the first rotation element S3, the second rotation element C3, and the third rotation element R3 of the third planetary gear set PG3 are a third sun gear, a third planet carrier, and a third ring gear, respectively, and the first rotation element S4, the second rotation element C4, and the third rotation element R4 of the fourth planetary gear set PG4 are a fourth sun gear, a fourth planet carrier, and a fourth ring gear, respectively.

As illustrated in FIG. 1, according to the various exemplary embodiments of the present invention, the second rotation element C1 of the first planetary gear set PG1 is fixedly connected to the input shaft INPUT, the third rotation element R1 is variably connected to the third rotation element R3 of the third planetary gear set PG3 while being fixed connected to the second rotation element C2 of the second planetary gear set PG2, the first rotation element S2 of the second planetary gear set PG2 is variably connected to the second rotation element C4 of the fourth planetary gear set PG4 while being variably connected to the first rotation element S3 of the third planetary gear set PG3, and the first rotation element S3 of the third planetary gear set PG3 is variably connected to the second rotation element C2 of the second planetary gear set PG2.

The first rotation element S1 of the first planetary gear set PG1 is fixedly disposed in the transmission housing by a first brake B1 among the shifting elements, the third rotation element R3 of the third planetary gear set PG3 is fixedly disposed in the transmission housing by a second brake B2 among the shifting elements, and the rest of the shifting elements are provided to form a variable connection structure between the rotation elements of the planetary gear sets.

Therefore, the first brake B1 is configured to constrain or release a rotation of the first rotation element S1 of the first planetary gear set PG1 and the second brake B2 is configured to constrain or release a rotation of the third rotation element R3 of the third planetary gear set PG3.

Furthermore, a first clutch CL1 among the shifting elements is configured to form a variable connection structure between the third rotation element R1 of the first planetary gear set PG1 and the third rotation element R3 of the third planetary gear set PG3, a second clutch CL2 among the shifting elements is configured to form a variable connection structure between the second rotation element C2 of the second planetary gear set PG2 and the first rotation element C3 of the third planetary gear set PG3, a third clutch CL3 among the shifting elements is configured to form a variable connection structure between a first rotation element S2 of the second planetary gear set PG2 and the first rotation element S3 of the third planetary gear set PG3, a fourth clutch CL4 among the shifting elements is configured to form a variable connection structure between the first rotation element S2 of the second planetary gear set PG2 and the second rotation element C4 of the fourth planetary gear set PG4, and a fifth clutch CL5 among the shifting elements is configured to form a variable connection structure between the input shaft INPUT and a second rotation element C4 of the fourth planetary gear set PG4.

The multi-stage transmission for a vehicle according to the various exemplary embodiments may be configured as follows. The multi-stage transmission for a vehicle is configured to include a first planetary gear set PG1, a second planetary gear set PG2, a third planetary gear set PG3, and a fourth planetary gear set PG4 each having three rotation elements; seven shifting elements configured to variably provide a frictional force; and eight rotation shafts connected to the rotation elements of the planetary gear sets, in which a first rotation shaft A1 is an input shaft INPUT which is directly connected to a second rotation element C1 of the first planetary gear set PG1 and a third rotation element R2 of the second planetary gear set PG2, a second rotation shaft A2 is directly connected to a first rotation element S1 of the first planetary gear set PG1, a third rotation shaft A3 is directly connected to a third rotation element R1 of the first planetary gear set PG1 and a second rotation element C2 of the second planetary gear set PG2, a fourth rotation shaft A4 is directly connected to a first rotation element S2 of the second planetary gear set PG2, a fifth rotation shaft A5 is directly connected a first rotation element S3 of the third planetary gear set PG3 and a first rotation element S4 of the fourth planetary gear set PG4, a sixth rotation shaft A6 is an output shaft OUTPUT which is directly connected to a second rotation element C3 of the third planetary gear set PG3 and a third rotation element R4 of the fourth planetary gear set PG4, a seventh rotation shaft A7 is directly connected to a third rotation element R3 of the third planetary gear set PG3, an eighth rotation shaft A8 is directly connected to a second rotation element C4 of the fourth planetary gear set PG4, a first clutch CL1 among the seven shifting elements is disposed between the third rotation shaft A3 and the seventh rotation shaft A7, a second clutch CL2 is disposed between the third rotation shaft A3 and the fifth rotation shaft A5, a third clutch CL3 is disposed between the fourth rotation shaft A4 and the fifth rotation shaft A5, a fourth clutch CL4 is disposed between the fourth rotation shaft A4 and the eighth rotation shaft A8, a fifth clutch CL5 is disposed between the first rotation shaft A1 and the eighth rotation shaft A8, a first brake B1 is disposed between the second rotation shaft A2 and a transmission housing, and a second brake B2 is disposed between the seventh rotation shaft A7 and the transmission housing.

Meanwhile, referring to FIG. 2, in a multi-stage transmission for a vehicle according to various exemplary embodiments of the present invention which is another exemplary embodiment of the present invention, the first rotation element S1 of the first planetary gear set PG1 is fixedly connected to the first rotation element S2 of the second planetary gear set PG2, the second rotation element C1 is variably connected to the third rotation element R3 of the third planetary gear set PG3 while being variably connected to the first rotation element S3 of the third planetary gear set PG3, the third rotation element R1 is variably connected to the first rotation element S3 of the third planetary gear set PG3 while being variably connected to the second rotation element C2 of the fourth planetary gear set PG4, and the second rotation element C2 of the second planetary gear set PG2 is fixedly connected to the input shaft INPUT.

Here, the first rotation element S1 of the first planetary gear set PG1 is fixedly disposed in the transmission housing by a first brake B1 of the shifting elements, the third rotation element R3 of the third planetary gear set PG3 is fixedly disposed in the transmission housing by a second brake B2 among the shifting elements, and the rest of the shifting elements are provided to form a variable connection structure between the rotation elements of the planetary gear sets.

That is, the first brake B1 is configured to constrain or release the rotation of the first rotation element S1 of the first planetary gear set PG1 and the first rotation element S2 of the second planetary gear set PG2, and the second brake B2 is configured to constrain or release a rotation of the third rotation element R3 of the third planetary gear set PG3.

Meanwhile, the first clutch CL1 among the shifting elements is configured to form the variable connection structure between the second rotation element C1 of the first planetary gear set PG1 and the third rotation element R3 of the third planetary gear set PG3, the second clutch CL2 among the shifting elements is configured to form the variable connection structure between the second rotation element C1 of the first planetary gear set PG1 and the first rotation element S3 of the third planetary gear set PG3, the third clutch CL3 among the shifting elements is configured to form the variable connection structure between the third rotation element R1 of the first planetary gear set PG1 and the first rotation element S3 of the third planetary gear set PG3, the fourth clutch CL4 among the shifting elements is configured to form the variable connection structure between the third rotation element R1 of the first planetary gear set PG1 and the second rotation element C4 of the fourth planetary gear set PG4, and the fifth clutch CL5 among the shifting elements is configured to form the variable connection structure between the input shaft INPUT and the second rotation element C4 of the fourth planetary gear set PG4.

The multi-stage transmission for a vehicle according to the various exemplary embodiments may be configured as follows. The multi-stage transmission for a vehicle is configured to include a first planetary gear set PG1, a second planetary gear set PG2, a third planetary gear set PG3, and a fourth planetary gear set PG4 each having three rotation elements; seven shifting elements configured to variably provide a frictional force; and eight rotation shafts connected to the rotation elements of the planetary gear sets, in which a first rotation shaft A1 is an input shaft INPUT which is directly connected to a second rotation element C2 of the second planetary gear set PG2, a second rotation shaft A2 is directly connected to a first rotation element S1 of the first planetary gear set PG1 and the first rotation element S2 of the second planetary gear set PG2, a third rotation shaft A3 is directly connected to a second rotation element C1 of the first planetary gear set PG1 and a third rotation element R2 of the second planetary gear set PG2, a fourth rotation shaft A4 is directly connected to a third rotation element R1 of the first planetary gear set PG1, a fifth rotation shaft A5 is directly connected a first rotation element S3 of the third planetary gear set PG3 and a first rotation element S4 of the fourth planetary gear set PG4, a sixth rotation shaft A6 is an output shaft OUTPUT which is directly connected to a second rotation element C3 of the third planetary gear set PG3 and a third rotation element R4 of the fourth planetary gear set PG4, a seventh rotation shaft A7 is directly connected to a third rotation element R3 of the third planetary gear set PG3, an eighth rotation shaft A8 is directly connected to a second rotation element C4 of the fourth planetary gear set PG4, a first clutch CL1 among the seven shifting elements is disposed between the third rotation shaft A3 and the seventh rotation shaft A7, a second clutch CL2 is disposed between the third rotation shaft A3 and the fifth rotation shaft A5, a third clutch CL3 is disposed between the fourth rotation shaft A4 and the fifth rotation shaft A5, a fourth clutch CL4 is disposed between the fourth rotation shaft A4 and the eighth rotation shaft A8, a fifth clutch CL5 is disposed between the first rotation shaft A1 and the eighth rotation shaft A8, a first brake B1 is disposed between the second rotation shaft A2 and a transmission housing, and a second brake B2 is disposed between the seventh rotation shaft A7 and the transmission housing.

Here, the first planetary gear set PG1, the second planetary gear set PG2, the third planetary gear set PG3, and the fourth planetary gear set PG4 are sequentially disposed along an axial direction of the input shaft INPUT and the output shaft OUTPUT.

Referring to FIG. 3, the multi-stage transmission for a vehicle according to the first and various exemplary embodiments includes four planetary gear sets and seven shifting elements, and may implement fourteen forward stages and two rearward stages.

Therefore, it is possible to implement a plurality of shift stages with a relatively smaller number of components and a simple structure to contribute to improve the fuel efficiency and silence of the vehicle, improving vehicle marketability.

In the meantime, the multi-stage transmission for a vehicle according to all exemplary embodiments of the present invention is configured to include a first complex planetary gear set (CPG1) and a second complex planetary gear set (CPG2) provided to transfer a torque between the input shaft INPUT and the output shaft OUTPUT and each include four rotation elements and seven shifting elements configured to be connected to the rotation elements of the complex planetary gear sets.

The first rotation element of the first complex planetary gear set CPG1 is fixedly disposed in the transmission housing CS by one of the shifting elements, the second rotation element is fixedly connected to the input shaft INPUT, the third rotation element is variably connected to the fourth rotation element of the second complex planetary gear set CPG2 while being variably connected to the first rotation element of the second complex planetary gear set CPG2, and the fourth rotation element is variably connected to the second rotation element of the second complex planetary gear set CPG2 while being variably connected to the first rotation element of the second complex planetary gear set CPG2.

The second rotation element of the second complex planetary gear set CPG2 is variably connected to the input shaft INPUT, the third rotation element is fixedly connected to the output shaft OUTPUT, and the fourth rotation element is fixedly disposed in the transmission housing CS by one of the shifting elements.

Here, the first rotation element of the first complex planetary gear set CPG1 is fixedly disposed in the transmission housing CS by the first brake B1 among the shifting elements, the fourth rotation element of the second complex planetary gear set CPG2 is fixedly disposed in the transmission housing CS by the second brake B2 among the shifting elements, and the rest of the shifting elements are provided to form the variable connection structure between the rotation elements of the complex planetary gear sets.

The first clutch CL1 among the shifting elements is configured to form the variable connection structure between the third rotation element of the first complex planetary gear set CPG1 and the fourth rotation element of the second complex planetary gear set CPG2, the second clutch CL2 among the shifting elements is configured to form the variable connection structure between the third rotation element of the first complex planetary gear set CPG1 and the first rotation element of the second complex planetary gear set CPG2, the third clutch CL3 among the shifting elements is configured to form the variable connection structure between the fourth rotation element of the first complex planetary gear set CPG1 and the first rotation element of the second complex planetary gear set CPG2, the fourth clutch CL4 among the shifting elements is configured to form the variable connection structure between the fourth rotation element of the first complex planetary gear set CPG1 and the second rotation element of the second complex planetary gear set CPG2, and the fifth clutch CL5 among the shifting elements is configured to form the variable connection structure between the input shaft INPUT and the second rotation element of the second complex planetary gear set CPG2.

Referring to FIG. 1, in the case of the multi-stage transmission for a vehicle according to the various exemplary embodiments, the first rotation element of the first complex planetary gear set CPG1 is configured for a first sun gear S1, the second rotation element is configured for a first planet carrier and a second ring gear C1/R2, the third rotation element is configured for a first ring gear and a second planet carrier R1/C2, the fourth rotation element is configured for a second sun gear S2, the first rotation element of the second complex planetary gear set CPG2 is configured for third and fourth sun gears S3/S4, the second rotation element is configured for a fourth planet carrier C4, the third rotation element is configured for a third planet carrier and a fourth ring gear C3/R4, and the fourth rotation element is configured for a third ring gear R3.

Referring to FIG. 2, in the case of the multi-stage transmission for a vehicle according to the various exemplary embodiments, the first rotation element of the first complex planetary gear set CPG1 is configured for the first and second sun gears S1/S2, the second rotation element is configured for the second planet carrier C2, the third rotation element is configured for the first planet carrier and the second ring gear C1/R2, the fourth rotation element is configured for the first ring gear R1, the first rotation element of the second complex planetary gear set CPG2 is configured for third and fourth sun gears S3/S4, the second rotation element is configured for the fourth planet carrier C4, the third rotation element is configured for the third planet carrier and the fourth ring gear C3/R4, and the fourth rotation element is configured for the third ring gear R3.

Figure 4:
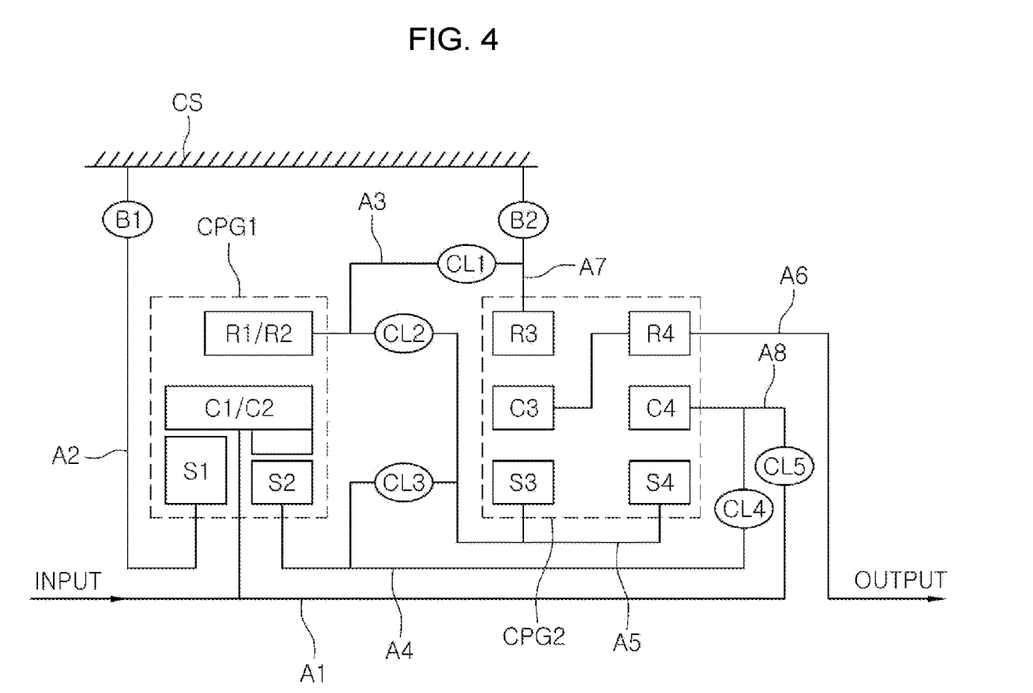
FIG. 4 is a view illustrating a multi-stage transmission for a vehicle according to various exemplary embodiments of the present invention.

FIG. 4 is a view illustrating a multi-stage transmission for a vehicle according to various exemplary embodiments of the present invention. Referring to FIG. 4, in the case of the various exemplary embodiments, the first rotation element of the first complex planetary gear set CPG1 is configured for a single pinion type first sun gear S1, the second rotation element is configured for first and second planet carriers C1/C2, the third rotation element is configured for first and second ring gears R1/R2, the fourth rotation element is configured for a double pinion type second sun gear S2, the first rotation element of the second complex planetary gear set CPG2 is configured for third and fourth sun gears S3/S4, the second rotation element is configured for a fourth planet carrier C4, the third rotation element is configured for a third planet carrier and a fourth ring gear C3/R4, and the fourth rotation element is configured for a third ring gear R3.

The multi-stage transmission for a vehicle according to all the exemplary embodiments may be configured as follows. The multi-stage transmission for a vehicle is configured to include the first complex planetary gear set CPG1 and the second complex planetary gear set CPG2; seven shifting elements configured to variably provide a frictional force; and eight rotation shafts connected to the rotation elements of the complex planetary gear sets.

The first rotation shaft A1 is the input shaft INPUT which is directly connected to the second rotation element of the first complex planetary gear set CPG1, the second rotation shaft A2 is directly connected to the first rotation element of the first complex planetary gear set CPG1, the third rotation shaft A3 is directly connected to the third rotation element of the first complex planetary gear set CPG1, the fourth rotation shaft A4 is directly connected to the fourth rotation element of the first complex planetary gear set CPG1, the fifth rotation shaft A5 is directly connected to the first rotation element of the second complex planetary gear set CPG2, the sixth rotation shaft A6 is the output shaft OUTPUT which is directly connected to the third rotation element of the second complex planetary gear set CPG2, the seventh rotation shaft A7 is directly connected to the fourth rotation element of the second complex planetary gear set CPG2, and the eighth rotation shaft A8 is directly connected to the second rotation element of the second complex planetary gear set CPG2.

Among the seven shifting elements, the first clutch CL1 is disposed between the third rotation shaft A3 and the seventh rotation shaft A7, the second clutch CL2 is disposed between the third rotation shaft A3 and the fifth rotation shaft A5, the third clutch CL3 is disposed between the fourth rotation shaft A4 and the fifth rotation shaft A5, the fourth clutch CL4 is disposed between the fourth rotation shaft A4 and the eighth rotation shaft A8, the fifth clutch CL5 is disposed between the first rotation shaft A1 and the eighth rotation shaft A8, the first brake B1 is disposed between the second rotation shaft A2 and the transmission housing CS, and the second brake B2 is disposed between the seventh rotation shaft A7 and the transmission housing CS.

Here, the first complex planetary gear set CPG1 and the second complex planetary gear set CPG2 are sequentially disposed along the axial direction of the input shaft INPUT and the output shaft OUTPUT.

Referring to FIG. 3, the multi-stage transmission for a vehicle according to the various exemplary embodiments includes two complex planetary gear sets and seven shifting elements, and may implement fourteen forward stages and two rearward stages. Therefore, it is possible to implement a plurality of shift stages with a relatively smaller number of components and a simple structure to contribute to improve the fuel efficiency and silence of the vehicle, improving vehicle marketability.

According to the multi-stage transmission for a vehicle having the structure described above, the rotation elements configuring the plurality of planetary gear sets are shifted while the rotation speed and direction are changed by the selective control operation of the clutch and the brake, and a gear ratio of fourteen forward stages and two rearward stages can be realized by the shifting operation to drive the vehicle.

Therefore, it is possible to improve the fuel efficiency by increasing the number of gears of the automatic transmission and enhancing the driving stability of vehicles by use of the operating point of the low RPM area of the engine.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission apparatus for a vehicle, comprising:
   an input shaft and an output shaft;
   a first planetary gear set, a second planetary gear set, a third planetary gear set, and a fourth planetary gear set provided to transfer a torque between the input shaft and the output shaft and each including three rotation elements having first, second, and third rotation elements; and
   seven shifting elements;
   wherein the first rotation element of the first planetary gear set is selectively connectable to a transmission housing by one of the seven shifting elements, and the second rotation element of the first planetary gear set is fixedly connected to the third rotation element of the second planetary gear set,
   wherein the first rotation element of the third planetary gear set is fixedly connected to the first rotation element of the fourth planetary gear set, the second rotation element of the third planetary gear set is fixedly connected to the third rotation element of the fourth planetary gear set and the output shaft, the third rotation element of the third planetary gear set is selectively connectable to the transmission housing directly by one of the seven shifting elements, and
   the second rotation element of the fourth planetary gear set is selectively connectable to the input shaft.

2. The transmission apparatus of claim 1, wherein the second rotation element of the first planetary gear set is fixedly connected to the input shaft, the third rotation element of the first planetary gear set is selectively connectable to the third rotation element of the third planetary gear set while being fixed connected to the second rotation element of the second planetary gear set,
- the first rotation element of the second planetary gear set is selectively connectable to the second rotation element of the fourth planetary gear set while being selectively connectable to the first rotation element of the third planetary gear set, and
- the first rotation element of the third planetary gear set is selectively connectable to the second rotation element of the second planetary gear set.

3. The transmission apparatus of claim 2, wherein the first rotation element of the first planetary gear set is selectively connectable to the transmission housing by a first brake among the seven shifting elements, and
- the third rotation element of the third planetary gear set is selectively connectable to the transmission housing by a second brake among the seven shifting elements.

4. The transmission apparatus of claim 3, wherein a first clutch among the seven shifting elements selectively connects the third rotation element of the first planetary gear set and the third rotation element of the third planetary gear set,
- a second clutch among the seven shifting elements selectively connects the second rotation element of the second planetary gear set and the first rotation element of the third planetary gear set,
- a third clutch among the seven shifting elements selectively connects the first rotation element of the second planetary gear set and the first rotation element of the third planetary gear set,
- a fourth clutch among the seven shifting elements selectively connects the first rotation element of the second planetary gear set and the second rotation element of the fourth planetary gear set, and
- a fifth clutch among the seven shifting elements selectively connects the input shaft and the second rotation element of the fourth planetary gear set.

5. The transmission apparatus of claim 1, wherein the first rotation element of the first planetary gear set is fixedly connected to the first rotation element of the second planetary gear set, the second rotation element of the first planetary gear set is selectively connectable to the third rotation element of the third planetary gear set while being selectively connectable to the first rotation element of the third planetary gear set, the third rotation element of the first planetary gear set is selectively connectable to the first rotation element of the third planetary gear set while being selectively connectable to the second rotation element of the fourth planetary gear set, and
- the second rotation element of the second planetary gear set is fixedly connected to the input shaft.

6. The transmission apparatus of claim 5, wherein the first rotation element of the first planetary gear set is selectively connectable to the transmission housing by a first brake among the seven shifting elements, and
- the third rotation element of the third planetary gear set is selectively connectable to the transmission housing by a second brake among the seven shifting elements.

7. The transmission apparatus of claim 6, wherein a first clutch among the seven shifting elements selectively connects the second rotation element of the first planetary gear set and the third rotation element of the third planetary gear set,
- a second clutch among the seven shifting elements selectively connects the second rotation element of the first planetary gear set and the first rotation element of the third planetary gear set,
- a third clutch among the seven shifting elements selectively connects the third rotation element of the first planetary gear set and the first rotation element of the third planetary gear set,
- a fourth clutch among the seven shifting elements selectively connects the third rotation element of the first planetary gear set and the second rotation element of the fourth planetary gear set, and
- a fifth clutch among the seven shifting elements selectively connects the input shaft and the second rotation element of the fourth planetary gear set.

8. A transmission apparatus for a vehicle, comprising:
an input shaft and an output shaft;
a first complex planetary gear set and a second complex planetary gear set provided to transfer a torque between the input shaft and the output shaft and each include four rotation elements having first, second, third, fourth rotation elements; and
seven shifting elements,
wherein the first rotation element of the first complex planetary gear set is selectively connectable to a transmission housing by one of the seven shifting elements, the second rotation element of the first complex planetary gear set is fixedly connected to the input shaft, the third rotation element of the first complex planetary gear set is selectively connectable to the fourth rotation element of the second complex planetary gear set while being selectively connectable to the first rotation element of the second complex planetary gear set, the fourth rotation element of the first complex planetary gear set is selectively connectable to the second rotation element of the second complex planetary gear set while being selectively connectable to the first rotation element of the second complex planetary gear set,
the second rotation element of the second complex planetary gear set is selectively connectable to the input shaft, the third rotation element of the second complex planetary gear set is fixedly connected to the output shaft, and the fourth rotation element of the second complex planetary gear set is selectively connectable to the transmission housing by one of the seven shifting elements.

9. The transmission apparatus of claim 8, wherein the first rotation element of the first complex planetary gear set is selectively connectable to the transmission housing by a first brake among the seven shifting elements, and
- the fourth rotation element of the second complex planetary gear set is selectively connectable to the transmission housing by a second brake among the seven shifting elements.

10. The transmission apparatus of claim 9, wherein a first clutch among the seven shifting elements selectively connects the third rotation element of the first complex planetary gear set and the fourth rotation element of the second complex planetary gear set,
- a second clutch among the seven shifting elements selectively connects the third rotation element of the first complex planetary gear set and the first rotation element of the second complex planetary gear set,
- a third clutch among the seven shifting elements selectively connects the fourth rotation element of the first complex planetary gear set and the first rotation element of the second complex planetary gear set,
- a fourth clutch among the seven shifting elements selectively connects the fourth rotation element of the first complex planetary gear set and the second rotation element of the second complex planetary gear set, and a fifth clutch among the seven shifting elements selectively connects the input shaft and the second complex rotation element of the second complex planetary gear set.

11. The transmission apparatus of claim 10, wherein the first rotation element of the first complex planetary gear set is a first sun gear, the second rotation element of the first complex planetary gear set is a first planet carrier and a second ring gear, the third rotation element of the first complex planetary gear set is a first ring gear and a second planet carrier, the fourth rotation element of the first complex planetary gear set is a second sun gear, the first rotation element of the second complex planetary gear set is third and fourth sun gears, the second rotation element of the second complex planetary gear set is a fourth planet carrier, the third rotation element of the second complex planetary gear set is a third planet carrier and a fourth ring gear, and the fourth rotation element of the second complex planetary gear set is a third ring gear.

12. The transmission apparatus of claim 10, wherein the first rotation element of the first complex planetary gear set is first and second sun gears, the second rotation element of the first complex planetary gear set is a second planet carrier, the third rotation element of the first complex planetary gear set is a first planet carrier and a second ring gear, the fourth rotation element of the first complex planetary gear set is a first ring gear, the first rotation element of the second complex planetary gear set is third and fourth sun gears, the second rotation element of the second complex planetary gear set is a fourth planet carrier, the third rotation element of the second complex planetary gear set is a third planet carrier and a fourth ring gear, and the fourth rotation element of the second complex planetary gear set is a third ring gear.

13. The transmission apparatus of claim 10, wherein the first rotation element of the first complex planetary gear set is a single pinion type first sun gear, the second rotation element is first and second planet carriers, the third rotation element is first and second ring gears, the fourth rotation element is a double pinion type second sun gear, the first rotation element of the second complex planetary gear set is third and fourth sun gears, the second rotation element is a fourth planet carrier, the third rotation element is a third planet carrier and a fourth ring gear, and the fourth rotation element is a third ring gear.

* * * * *